United States Patent
Shimizu et al.

[11] Patent Number: 6,125,962
[45] Date of Patent: Oct. 3, 2000

[54] CABLE-TYPE STEERING DEVICE

[75] Inventors: Yasuo Shimizu; Hiroshi Tabata, both of Wako, Japan

[73] Assignee: Honda Giken Kogyo Kabushiki Kaisha, Tokyo, Japan

[21] Appl. No.: 08/917,079

[22] Filed: Aug. 25, 1997

[30] Foreign Application Priority Data

Aug. 26, 1996 [JP] Japan .................................. 8-223466

[51] Int. Cl.$^7$ ...................................................... B62D 3/00
[52] U.S. Cl. ........................... 180/400; 180/427; 180/431
[58] Field of Search .................................. 180/336, 400, 180/425–428, 431; 74/496; 280/92, 96; 114/144 R, 154, 159, 160, 161

[56] References Cited

U.S. PATENT DOCUMENTS 155,926 10/1874 Cathcart .
3,007,429 11/1961 Sandman .
4,367,881 1/1983 Williams .................................. 280/96

*Primary Examiner*—Christopher P. Schwartz
*Assistant Examiner*—C. T. Bartz
*Attorney, Agent, or Firm*—Armstrong, Westerman, Hattori, McLeland & Naughton

[57] ABSTRACT

In a wire-type steering device in which a steering wheel and a gear box are connected to each other by wires, one end of each inner cable of two Bowden wires are wound around a driving pulley which is mounted on a rotary shaft of a steering wheel. The inner cables are inserted through the inside of outer tubes fixed at their corresponding ends to a driving pulley housing. The direction of drawing of the Bowden wires from the driving pulley housing is offset at an angle $\alpha$ in a forward direction of a vehicle body relative to a plane perpendicular to the rotary shaft 12, thereby preventing the Bowden wires from being exposed inside of a vehicle compartment, and/or from interfering with an instrument panel and the like.

3 Claims, 6 Drawing Sheets

CABLE-TYPE STEERING DEVICE

BACKGROUND OF THE INVENTION

1. Technical Field of the Invention

The present invention relates to a cable-type steering device, including a wire driving means connected to a steering wheel, and a wire follower means connected to a gear box for steering vehicle wheels. The wire driving means and the wire follower means are connected to each other by wires, so that a steering torque inputted to the steering wheel is transmitted to the gear box through the wires.

2. Description of the Related Art

In a conventional steering device for a vehicle, a steering shaft having a steering wheel at an upper end thereof is connected at its lower end to the gear box, so that the steering torque inputted to the steering wheel is transmitted through the steering shaft to a rack and pinion mechanism which is mounted within the gear box.

However, if the steering wheel and the gear box are connected to each other using the steering shaft, the position of the steering wheel relative to the position of the gear box is relatively fixed, and there is little freedom in selecting a preferred position for either element. For this reason, there is encountered a problem in that the degree of freedom of design is substantially limited, and further, the gear box can not be commonly used in a right-hand steered vehicle and a left-hand steered vehicle. Moreover, another problem is that vibrations inputted to a tire from a road surface and the vibration of an engine are inputted to the steering wheel through the steering shaft and hence, the level of audible sound within a vehicle compartment and the riding comfort are impeded by such vibrations.

Therefore, there is a proposed cable-type steering device which employs a flexible transmitting means such as a Bowden wire and the like in place of the conventional steering shaft (see Japanese Patent Application Laid-open No.8-2431).

If the construction of the proposed cable-type steering device is used, the position of the steering wheel relative to the position of the gear box can be freely selected and moreover, the vibration of the gear box is not readily transmitted to the steering wheel and hence, the above-described problems can be solved.

In the proposed cable-type steering device, however, the direction of drawing of the wire from the pulley mounted on the rotary shaft of the steering wheel is a direction perpendicular to the rotary shaft. For this reason, in order to avoid marring the appearance due to the exposure of the wire to the inside of a vehicle compartment short of an instrument panel, it is necessary to take the design in the vicinity of the steering wheel into special consideration.

The present invention has been accomplished with the above circumstance in view, and one object of the present invention to facilitate handling of the wires connecting the steering wheel and the gear box to enhance the appearance around the steering wheel.

SUMMARY OF THE INVENTION

In the present invention, the direction of drawing of the wires from the wire driving means is offset in a direction away from the steering wheel with respect to a plane perpendicular to a rotary shaft of the steering wheel. Therefore, it is easy to handle the wires so that they can not be viewed from the vehicle compartment, leading to an enhanced appearance around the steering wheel.

According to one embodiment of the invention, intermediate portions of the wires abut against a guide pulley. Thus, the direction of drawing of the wires can be largely offset without increasing the operating load on the wires.

According to another embodiment of the invention, the wire driving means is mounted on an intermediate shaft which is connected to the rotary shaft of the steering wheel through a gear mechanism. Thus, the direction of drawing of the wires can be largely offset without increasing the operating load on the wires. Moreover, the shift ratio between the steering wheel and the wire driving means can be set at any value by a gear mechanism.

BRIEF DESCRIPTION OF THE DRAWINGS

The mode for carrying out the present invention will now be described by way of embodiments with reference to the accompanying drawings, wherein.

DESCRIPTION OF THE PREFERRED EMBODIMENTS

Figure 1:
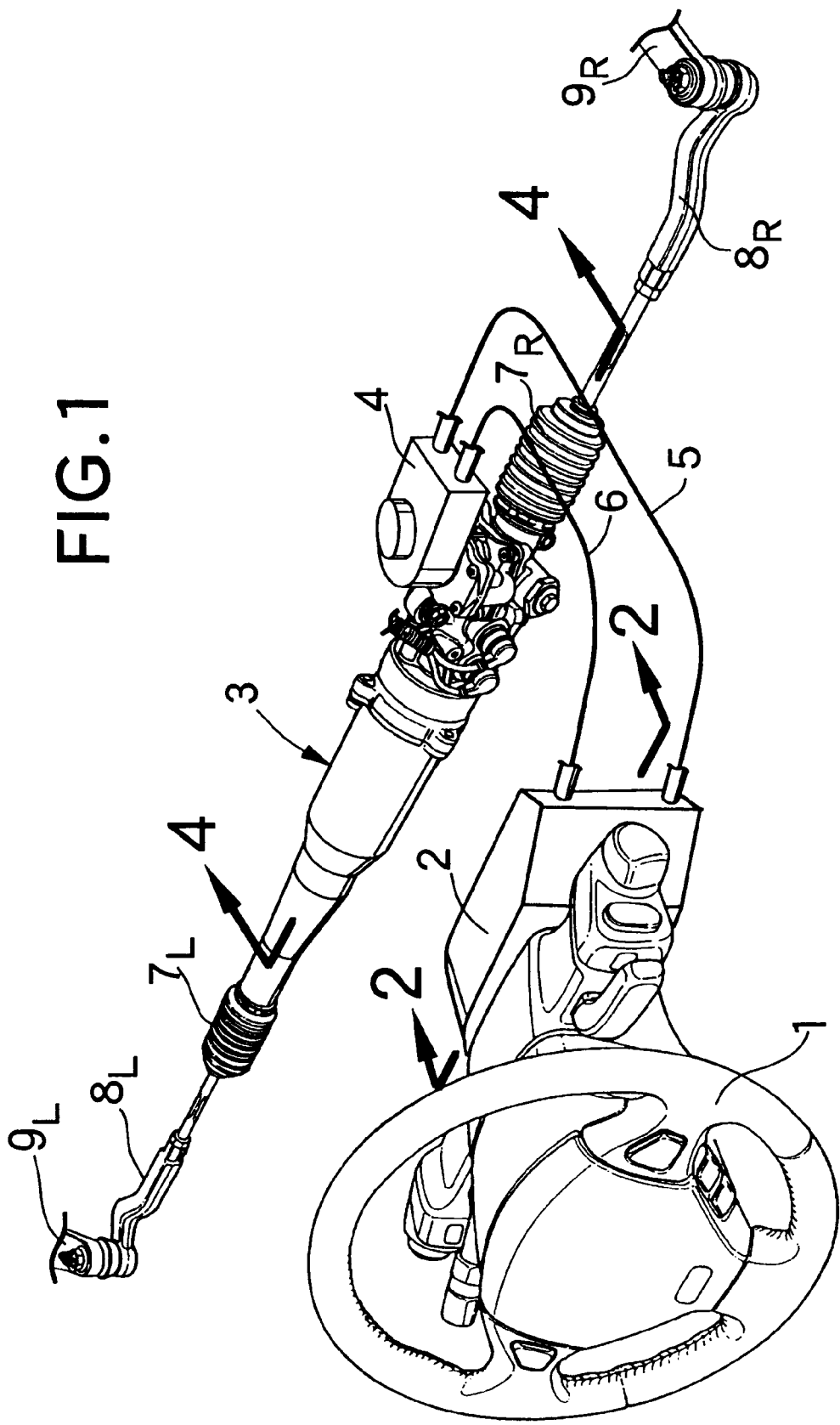
FIG. 1 is a perspective view of the entire arrangement of a steering device for a vehicle.

As shown in FIG. 1, a driving pulley housing 2 mounted in front of a steering wheel 1 of a vehicle and a follower pulley housing 4 mounted on a gear box 3 are connected to each other by two Bowden wires 5 and 6. Tie rods $8_L$ and $8_R$ extend laterally of a vehicle body through boots $7_L$ and $7_R$ mounted at opposite ends of the gear box 3, and are connected to knuckles $9_L$ and $9_R$ for supporting left and right wheels (not shown).

Figure 2:
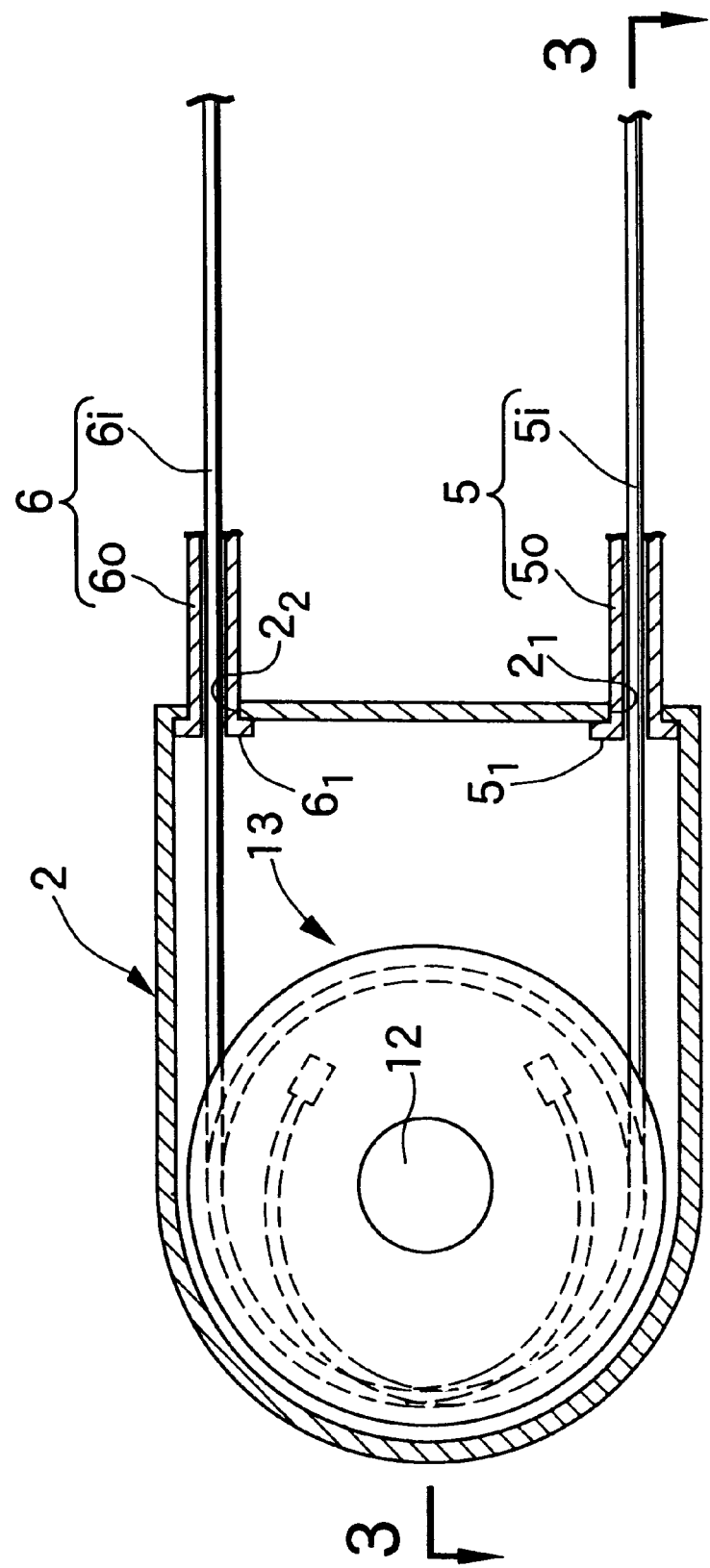
FIG. 2 is an enlarged sectional view taken along a line 2—2 in FIG. 1.
Figure 3:
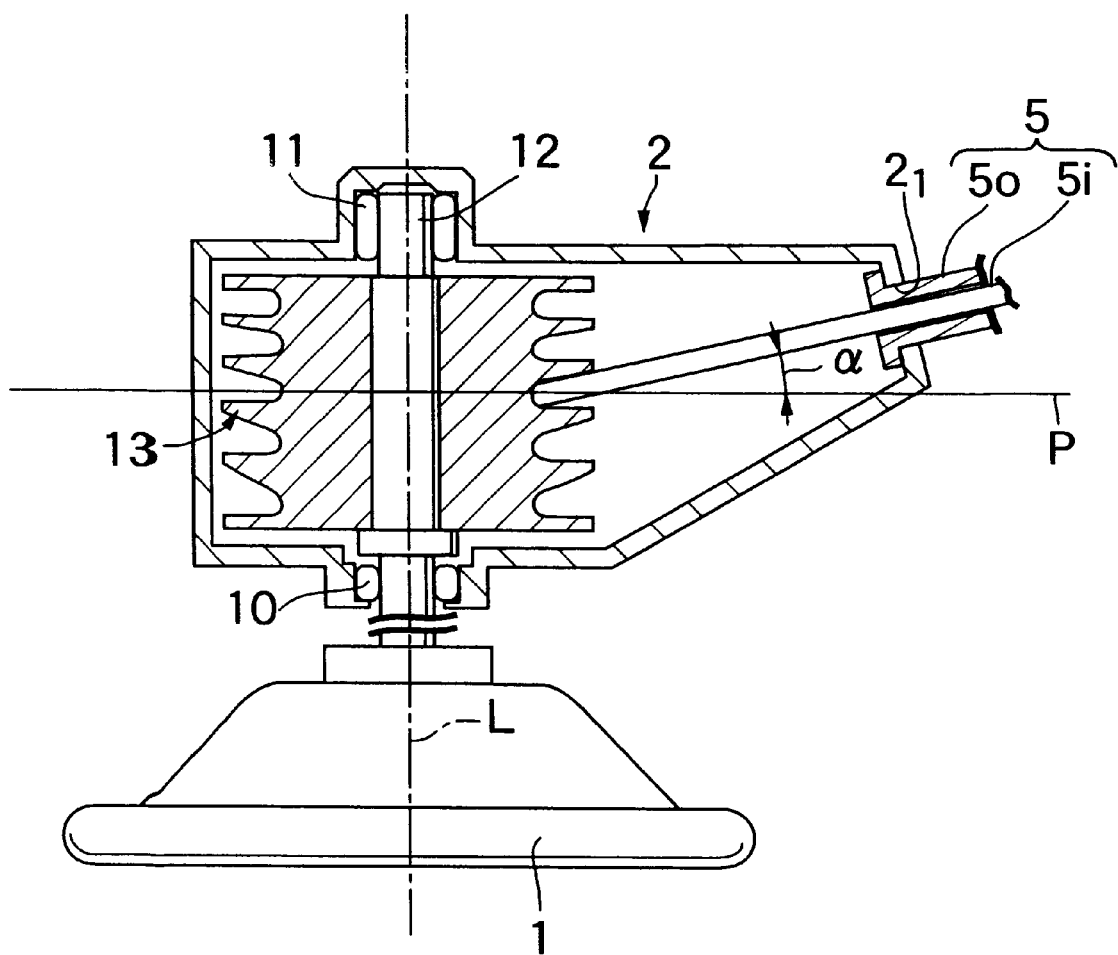
FIG. 3 is a sectional view taken along a line 3—3 in FIG. 2.

As shown in FIGS. 2 and 3, a driving pulley 13 is secured to a rotary shaft 12 which is supported on two bearings 10 and 11 in the driving pulley housing 2 and rotated along with the steering wheel 1. The Bowden wire 5 is comprised of an outer tube 5o and an inner cable 5i slidably fitted in the outer tube 5o. Likewise, the Bowden wire 6 is comprised of an outer tube 6o and an inner cable slidably fitted in the outer tube 6o.

One end of each of the inner cables 5i and 6i is wound about one and half turns in opposite directions around an outer periphery of the driving pulley 13, while corresponding ends of the outer tubes 5o and 6o are passed through two cable insert bores 21 and 22 defined in the driving pulley housing 2, and have flange portions 51 and 61 locked to an inner surface of the driving pulley housing 2.

As can be seen from FIG. 3, the Bowden wire 5 is drawn from an axially central portion of the driving pulley 13 (the Bowden wire 6 is likewise drawn) and extends forwards of the vehicle body (in a direction away from the steering wheel 1) in an attitude inclined at an angle a with respect to a plan e P perpendicular to an axis L of the rotary shaft 12. The angle α can be set at any value by off setting the cable insert bores 21 and 22 in the driving pulley housing 2 forwards of the vehicle body with respect to the plane P. A groove made in the driving pulley 13 has a sectional shape such that it is inclined with respect to the plane P in order to avoid interference with the inner cables 5i and 6i drawn in the inclined attitudes.

Figure 4:
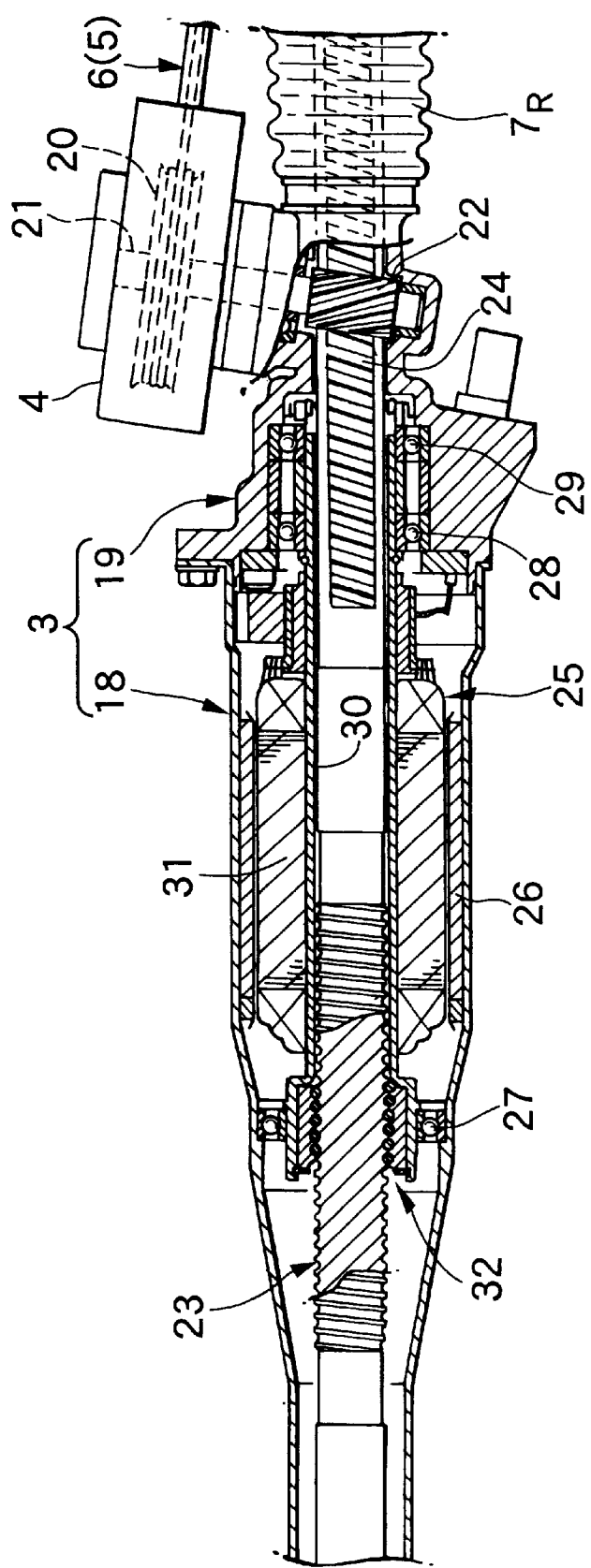
FIG. 4 is an enlarged sectional view taken along a line 4—4 in FIG. 1.

As shown in FIG. 4, the gear box 3 is divided into a left motor accommodating chamber 18 and a right rack and pinion accommodating chamber 19 p and the follower pulley housing 4 is supported on the rack and pinion accommodating chamber 19. A rotary shaft 21 integral with a follower pulley 20 mounted in the follower pulley housing 4 extends into the rack and pinion accommodating chamber 19, and a pinion 22 is secured to such extension. A steering rod 23 connected at its opposite ends to the tie rods $8_L$ and $8_R$ is laterally slidably supported within the gear box 3, and the pinion 22 is meshed with a rack 24 formed on the steering rod 23.

The other ends of the inner cables 5i and 6i of the two Bowden wires 5 and 6 are wound around and fixed to an outer periphery of the follower pulley 20, and the corresponding ends of the outer tubes 5o and 6o are fixed at a proper point of the follower pulley housing 4.

A motor 25 f or a power-steering operation is accommodated in the motor accommodating chamber 18 in the gear box 3. The motor 25 for the power steering operation includes a stator 26 secured to an inner peripheral surface of the motor accommodating chamber 18, a motor output shaft 30 rotatably supported on the inner peripheral surface of the motor accommodating chamber 18 through three ball bearings 27, 28 and 29, and fitted over an outer periphery of the steering rod 23, and a rotor 31 secured to the motor output shaft 30 and opposed to the stator 26. A ball screw mechanism 32 is interposed between an inner peripheral surface of the motor output shaft 30 and an outer peripheral surface of the steering rod 23, so that a steerage assisting force for laterally reciprocating the steering rod 23 can be generated by driving the motor 25 to rotate the motor output shaft 30 in opposite directions.

The operation of the embodiment of the present invention having the above-described arrangement will be described below.

For example, if the steering wheel 1 is rotated in a rightward direction to turn the vehicle rightwards, the rotary shaft 12 is rotated in a clockwise direction with the driving pulley 13 in FIG. 2. As a result, the inner cable 5i of the Bowden wire 5 is pulled, and the inner cable 6i of the Bowden wire 6 is loosened. This causes the rotation of the driving pulley 13 to be transmitted to the follower pulley 20 to rotate the rotary shaft 21, so that a steering torque is transmitted through the pinion 22 to the rack 24.

If the steering torque is detected by a detecting means (not shown), the detection value of the steering torque is subjected to a calculation along with another control signal in an electronic control unit, and the motor 25 for the power-steering operation is driven based on the result of the calculation. Then, the steering rod 23 is biased laterally by the motor 25 for the power-steering operation, thereby assisting the driver's manipulation of the steering wheel 1.

Since the steering wheel 1 and the gear box 3 are connected to each other by the Bowden wires 5 and 6 having a flexibility as described above, the steering wheel 1 can be disposed at any location with respect to the gear box 3, thereby providing an increased degree of freedom of design. Thus, the gear box 3 can be commonly used in a right-hand steered vehicle and a left-hand steered vehicle, and the structures of a tilt mechanism and a telescopic mechanism for the steering wheel 1 can be simplified.

A conventional steering shaft connecting the steering wheel 1 and the gear box 3 is not used and hence, the vibration of the gear box 3 and the vibration of an engine are not readily transmitted to the steering wheel 1, thereby not only providing an enhanced riding comfort, but also ensuring a sufficient space around driver's feet to provide an enhanced operator comfort. Moreover, in the event of a collision of the vehicle, steering wheel 1 can be moved forwards of the vehicle body at a sufficient stroke and hence, a large shock absorbing effect can be exhibited.

Moreover, when the driving pulley housing 2 is mounted to an instrument panel, the direction of drawing the Bowden wires 5 and 6 from the driving pulley housing 2 is an obliquely forward direction rather than a lateral direction of the vehicle body. Therefore, the Bowden wires 5 and 6 can be easily accommodated within the instrument panel and hidden so that they can not be viewed from a vehicle compartment. Thus, it is possible to provide an enhancement in degree of freedom of the design and an enhanced appearance.

Figure 5:
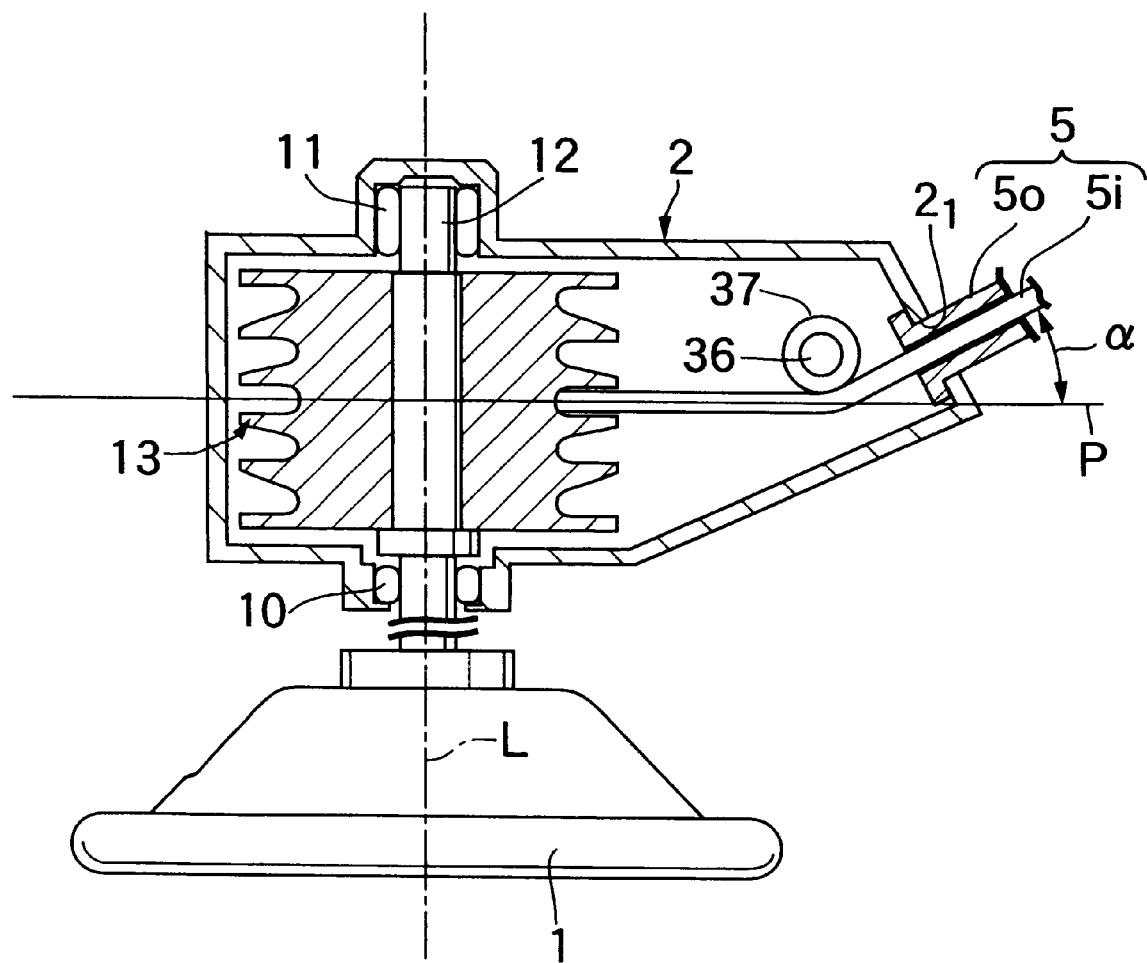
FIG. 5 is a view similar to FIG. 3, but illustrating a second embodiment of the invention.

A second embodiment of the present invention will now be described with reference to FIG. 5.

In the second embodiment, a pair of guide pulleys 37, 37 are supported on a guide pulley shaft 36 mounted within the driving pulley housing 2, and the inner cables 5i and 6i of the Bowden wires 5 and 6 abut against the guide pulleys 37, 37. Thus, the direction of drawing of the inner cables 5i and 6i is inclined at an angle with respect to the plane P in a forward direction of the vehicle body.

With the second embodiment, the directions of sliding movement of the inner cables 5i and 6i are always kept constant with respect to the directions of the ends of the outer tubes 5o and 6o. Therefore, this eliminates any pinching between the outer tubes 5o and 6o and the inner cables 5i and 6i and enables a further smooth operation of the Bowden wires 5 and 6.

Figure 6:
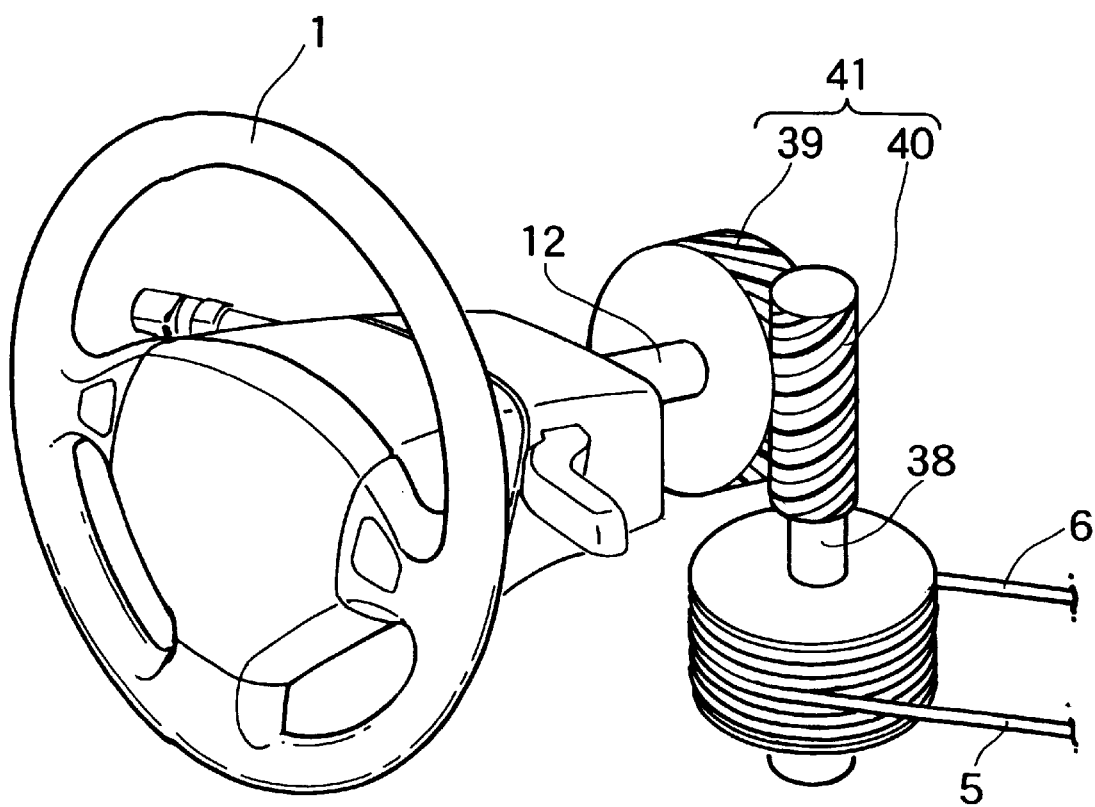
FIG. 6 is a perspective view of a steering device for a vehicle according to a third embodiment of the invention.

A third embodiment of the present invention will be described with reference to FIG. 6.

In the third embodiment, an intermediate shaft 38 is disposed substantially vertically in the vicinity of a rotary shaft 12 of a steering wheel 1 disposed in a substantially longitudinal direction of the vehicle body. The rotary shaft 12 and the intermediate shaft 38 are connected to each other by a worm gear 41 which is comprised of a worm wheel 39 and a worm 40. A driving pulley 13 is mounted on the intermediate shaft 38. The worm gear 41 is adapted to transmit the rotation from the worm wheel 39 toward the worm 40 through a reduction in speed, and also to transmit the rotation from the worm 40 toward the worm wheel 39 through an increase in speed. Two Bowden wires 5 and 6 wound around the driving pulley 13 are drawn out, so that they are inclined in the forward direction of the vehicle body as viewed in a horizontal plane. Thus, as in the first and second embodiments, the Bowden wires 5 and 6 can be easily accommodated within an instrument panel and hidden so that they can not be visually seen from the vehicle compartment. Moreover, the ratio of the number of rotations of the driving pulley 13 to the number of rotations of the steering wheel 1 can be set at any value by selecting the gear ratio of the worm gear 41.

Although the embodiments of the present invention have been described in detail, it will be understood that the present invention is not limited to the above-described embodiments, and various modifications in design may be made without departing from the spirit and scope of the invention defined in claims.

For example, the intermediate shaft 38 is vertically disposed in the third embodiment, but the direction of the disposition of the intermediate shaft 38 is not necessarily so limited. Thus, if the intermediate shaft 38 is disposed in a plane perpendicular to the rotary shaft 12 of the steering wheel 1, the Bowden wires 5 and 6 can be drawn out from the driving pulley 13 so that they are inclined in the forward direction of the vehicle body.

The driving pulley 13 and the follower pulley 20 are employed as a wire driving means and a wire follower means in the embodiments. However, in place of the pulleys 13 and 20, arms or levers may be employed which are secured at their central portions to the rotary shafts 12 and 21 and connected at their opposite ends to the inner cables 5i and 6i of the Bowden wires 5 and 6. In addition, another gear mechanism such as a bevel gear and the like may be employed in place of the worm gear 41.

As previously discussed, according to one embodiment of the present invention, the direction of drawing of the wires from the wire driving means is offset in a direction away from the steering wheel with respect to a plane perpendicular to the rotary shaft of the steering wheel. Therefore, the wires drawn from the wire driving means can be easily handled so that they are not seen from the vehicle compartment, thereby enhancing both the degree of freedom of design and appearance around the steering wheel.

According to another embodiment of the present invention, the direction of drawing of the wires is offset by abutting intermediate portions of the wires against guide pullies in the vicinity of the wire driving means. Therefore, the drawing direction can be largely offset without increasing the operating load on the wires.

According to a still further embodiment of the present invention, the direction of drawing of the wires is offset by mounting the wire driving means on an intermediate shaft which is connected to the rotary shaft of the steering wheel through a gear mechanism. Therefore, the drawing direction can be largely offset without increasing the operating load on the wires, and further, the shift ratio between the steering wheel and the wire driving means can be set at any value.

What is claimed is:

1. A cable-type steering device for a vehicle body, comprising:

a wire driving means having a rotary shaft and a driving pulley secured to said rotary shaft rotatable thereabout, said rotary shaft being connected to a steering wheel;

a wire follower means connected to a gear box for steering a vehicle;

wires wound around said driving pulley and interconnecting said wire driving means and said wire follower means so that a steering torque inputted to the steering wheel is transmitted to the gear box through said wires; and a housing enclosing said rotary shaft and said driving pulley therein and having cable insert bores through which said wires pass, wherein the direction of drawing of said wires from said housing through said cable insert bores is adapted to be offset in an obliquely forward direction of said vehicle body.

2. A cable-type steering device according to claim 1, including at least one guide pulley in the vicinity of the wire driving means and the direction of drawing of said wires is offset by putting intermediate portions of said wires into abutment against said guide pulley.

3. A cable-type steering device according to claim 1, wherein said steering wheel is mounted on said rotary shaft, said wire driving means is mounted on a second shaft, said second shaft is connected to said rotary shaft of said steering wheel through a gear mechanism, and the axis of said second shaft is oriented relative to the axis of said rotary shaft whereby the direction of drawing said wires is offset.

* * * * *